United States Patent [19]
Gilmore

[11] 4,344,518
[45] Aug. 17, 1982

[54] SELF-ADJUSTING CABLE CONDUIT MECHANISM

[75] Inventor: William J. Gilmore, Manitou Beach, Mich.

[73] Assignee: Acco Industries Inc., Trumbull, Conn.

[21] Appl. No.: 189,362

[22] Filed: Sep. 22, 1980

[51] Int. Cl.³ .............................................. F16D 13/75
[52] U.S. Cl. ............................................... 192/111 A
[58] Field of Search ............ 192/111 A, 111 R, 99 S, 192/110 R, 70.25; 188/196 B, 71.8

[56] References Cited

U.S. PATENT DOCUMENTS

| | | | |
|---|---|---|---|
| 1,804,309 | 5/1931 | Bourbeau | 188/196 B |
| 2,788,095 | 4/1957 | Brooks | 188/196 B |
| 3,194,349 | 7/1965 | Kershner et al. | 188/196 B |
| 3,200,912 | 8/1965 | Martin | 188/196 B |
| 4,057,135 | 11/1977 | Mori | 192/111 A |

FOREIGN PATENT DOCUMENTS 2910421 9/1979 Fed. Rep. of Germany ... 192/111 A

*Primary Examiner*—George H. Krizmanich
*Attorney, Agent, or Firm*—Pennie & Edmonds

[57] ABSTRACT

A self-adjusting cable conduit mechanism for automatically compensating for wear in a control cable system adapted to connect a controlled member with an actuation member in order to maintain proper tension and tolerances in the system.

4 Claims, 5 Drawing Figures

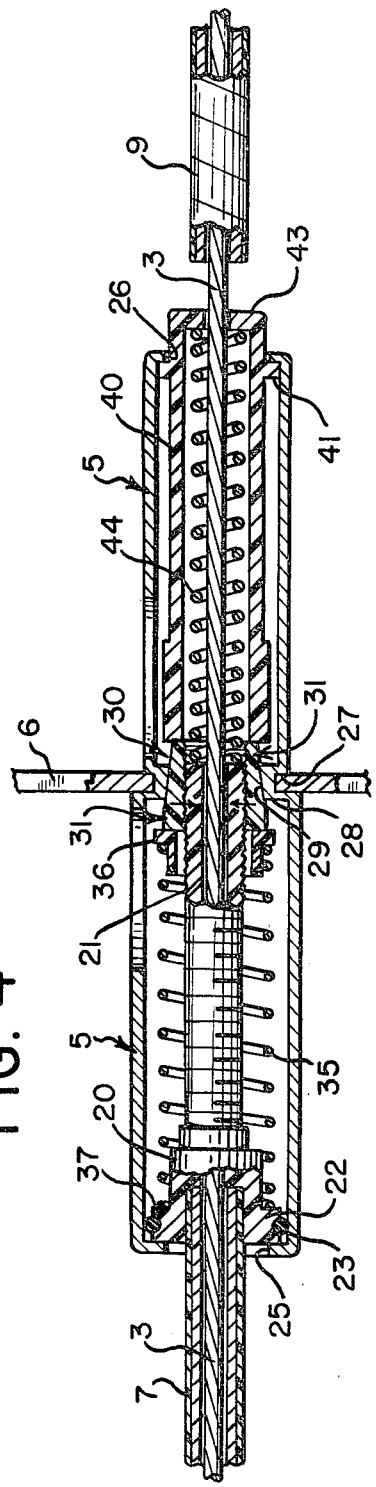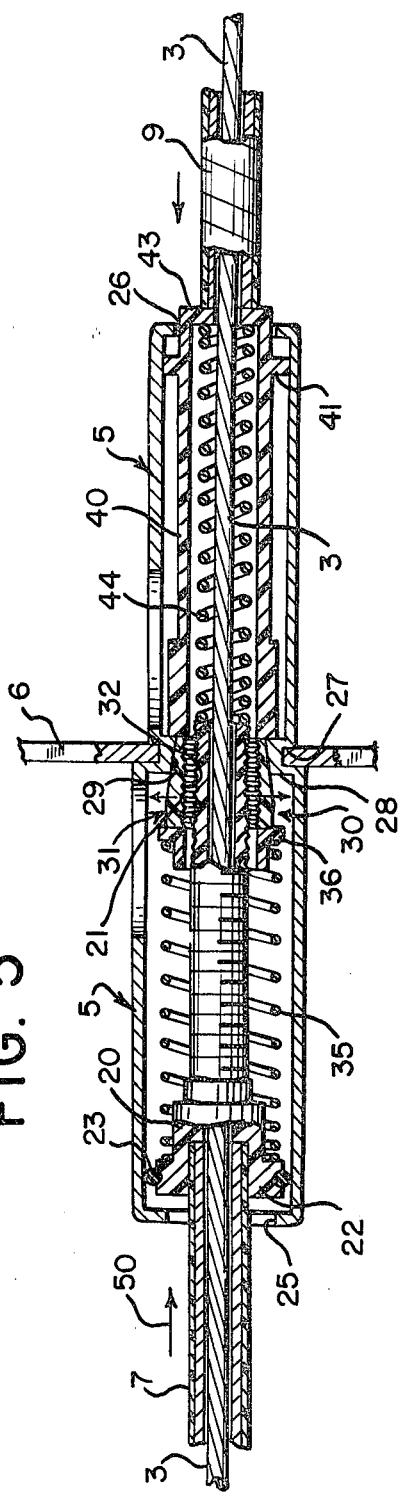

SELF-ADJUSTING CABLE CONDUIT MECHANISM

CROSS-REFERENCE TO OTHER APPLICATIONS

This application relates to a mechanism for adjusting a cable conduit using a locking means of the type disclosed in copending application Ser. No. 158,315 filed June 10, 1980 and assigned to the same assignee as the instant application, where the clutch means of the application adjusts a control cable.

BACKGROUND OF THE INVENTION

Cable operated controls are utilized in a number of control systems, as for example, braking systems and clutch control systems for automobiles. Such systems usually have a control cable which extends from an actuation member, for example a clutch or brake pedal, to a controlled member such as a brake shoe actuation mechanism or clutch. The control cable itself often extends through and is guided by a control cable conduit which serves to protect the control cable as well as to guide it around corners. The control cables in such systems usually require precise adjustment to accommodate for wear and manufacturing tolerances in the systems.

In manual shift systems of automobiles, the clutch facing plate wears during use resulting in the relatively heavy clutch spring drawing the control cable further towards the clutch and effectively shortening the cable such that play will be introduced between the clutch pedal and control cable. On the other hand in braking systems, the effective length of the control cable is lengthened as brake shoes wear down which results in undesirable play being introduced into the brake system requiring the brake pedal to be depressed excessively before a braking force is exerted.

Undesirable play can also be introduced into a control system incorporating cable conduits caused by wear between the cables and the inner walls of the conduits. In addition wear may occur between a control cable and attachments, for example sheaves over which cables extend, which further may introduce undesirable play into a control cable system.

Various mechanisms have been proposed in order to provide automatic adjustment of cable control devices to accommodate wear of the various parts as mentioned above. For example, on one manual gear shift system, a clutch control cable is connected to a clutch pedal through means of a pawl which slides over a toothed arcuate segment connected to the clutch pedal and where the pedal includes a tension spring exerting a tension on the tooth segment. Such a device however does not always effectively take up play in the system resulting from wear as in some instances, the pawl may slide over a number of teeth of the tooth segment before engaging one. Under certain driving conditions this can be dangerous when it is necessary to quickly disengage the clutch.

It is therefore an object of the invention to provide for a cable conduit mechanism which will automatically compensate for wear in a control cable system where the mechanism is easily installed in existing control cable systems and which is inexpensive to manufacture and at the same time will provide safe and positive operation.

GENERAL DESCRIPTION OF THE INVENTION

I have found that rather than changing the actual length of a control cable to accommodate wear of parts in a control cable system, as in the prior art mechanism described above, the effective length of the control cable may be changed by changing the length of the conduit in which the cable is guided which will then effectively lengthen or shorten the control cable to provide the necessary degree of adjustment. For example, as the clutch plate wears in a manual transmission as explained above, the effective length of the control cable is shortened such that the cable must be lengthened to provide the necessary degree of adjustment. Rather than actually lengthening the control cable, I provide a mechanism which shortens the conduit in which the cable is guided whereby the result is to increase the effective length of the cable extending between the clutch and clutch pedal. In the case of brake systems, where the effective length of the control cable must be shortened to accommodate wear, the conduit within which the control cable is guided is effectively lengthened resulting in effectively shortening the control cable extending between the brake shoe mechanism and brake pedal.

A self-adjusting cable conduit mechanism constructed according to my invention is adapted for use in a system including a control cable which connects a controlled member, such as a clutch or brake, with an actuation member, such as a clutch pedal or brake pedal. The mechanism includes a housing which is adapted to be anchored with respect to the control cable, for example to a fire wall separating the engine compartment from the passenger compartment of an automobile. A first cable conduit surrounds the control cable and has one end terminating in the housing and is adapted to extend from the housing towards the controlled member to provide a guide therefore. The end of the first cable conduit within the housing is serrated. A spring activated locking means is included in the housing and is adapted to engage and lock with the serrated portion of the first cable conduit to limit the movement of the conduit into the housing. A first spring means is included in the housing and is operatively positioned between the first cable conduit and the locking means in order to urge the locking means into locking engagement with the serrated portion and a locking release means is operatively positioned between the actuation member and the locking means. A second spring means is operatively positioned between the end of the first cable conduit and the release member to urge the first cable conduit outwardly of the housing towards the controlled member. When the locking release means is moved by the actuation member against the force of the first and second springs, the release means will disengage the locking means to allow the first cable conduit to move with respect to the housing under the influence of the second spring means such that the exact length of the cable conduit extending from the housing towards the controlled member may be varied.

Preferably a second cable to provide a guide therefore conduit surrounds the control cable and is engaged at one end by the actuation member and its other end is adapted to engage the locking release means.

The locking release means preferably comprises a tubular member within the housing, one end of which engages the locking means and the other end of which protrudes from the housing adapted to be engaged by the end of the second conduit means. The locking means preferably comprises a plurality of locking collets which are forced radially inwardly towards the serrated portion upon engagement with a tapered wall portion of the housing.

BRIEF DESCRIPTION OF THE DRAWINGS

FIG. 4 is an enlarged view of the self-adjusting cable conduit mechanism of FIG. 1 illustrating the positioning of parts upon tensioning of the control cable by an actuation member; and FIG. 5 is a view similar to FIG. 4 illustrating the positioning of the parts when the control cable is untensioned.

BEST MODE FOR CARRYING OUT THE INVENTION

Figure 1:
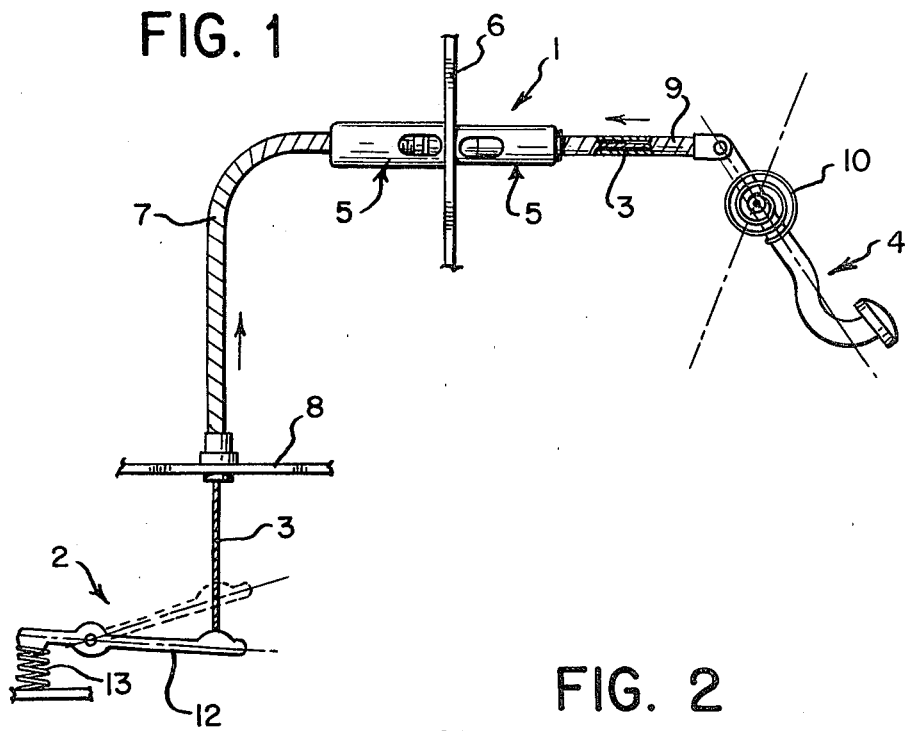
FIG. 1 is a schematic view of a self-adjusting cable conduit mechanism constructed according to the invention installed in a control cable system for actuating a manual transmission of an automobile.

Referring to FIG. 1 there is illustrated a self-adjusting cable conduit mechanism 1 constructed according to the invention having a controlled member 2 in the form of a clutch which is connected by a movable control cable 3 to an actuation member 4 in the form of a clutch pedal. The mechanism includes a housing 5 through which the cable 3 extends which is anchored to a fixed portion of a vehicle, for example a fire wall 6 separating an engine compartment from a passenger compartment whereby the housing is anchored with respect to the movable control cable. A first cable conduit 7 surrounding the cable 3 extends from the housing 5 towards the controlled member 2 and is anchored at one end at a cable anchorage point 8. A second cable conduit 9 surrounds the control cable 3 and extends between the actuation member of clutch pedal 4 and the housing 5. Both the first and second cable conduits serve as guides for the control cable.

A pedal return spring 10 serves to raise the pedal to an "up" position when it is not depressed to exert a tension force on the control cable 3 to actuate the controlled member 2. The controlled member 2 includes a lever 12 forming part of the clutch of a transmission system which includes a clutch spring 13 for forcing facing plates, not shown, of the clutch into driving engagement.

To operate the cable control system shown in FIG. 1, pedal 4 is depressed to exert tension upon the control cable 3 which will move the lever 12 against the force of the clutch spring 13 to disengage the clutch allowing gears to be shifted. The spring 13 conventionally has a force of approximately 200 pounds in order to insure effective driving engagement between the plates of the clutch when engaged.

Figure 2:
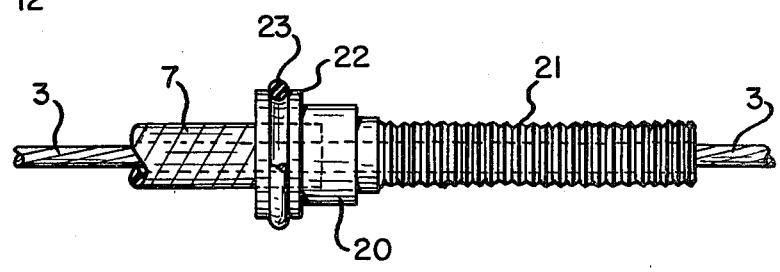
FIG. 2 is an enlarged view of an end of a control cable conduit adapted to extend from a housing of the mechanism of FIG. 1 towards a clutch.

As shown in FIG. 2, the end of the first conduit 7 which extends into the housing is connected to a tubular member 20 having a serrated portion 21 thereon as well as a guide collar 22 onto which an O ring 23 is placed.

Referring to FIGS. 4 and 5, the housing 5 has an aperture 25 at one end through which the first cable conduit 9 and cable 3 extend and an aperture 26 at its opposite end. The housing includes a groove 27 in order that it may be anchored with respect to the fire wall 6. The left side of the housing as shown in FIG. 4 is separated from the right side by an internal shoulder 28 which has a circular tapered wall portion 29.

Figure 3:
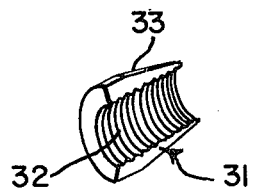
FIG. 3 is a perspective view of a locking collet utilized in the mechanism of FIG. 1.

A locking means 30 in the form of a plurality of collets 31 are adapted to engage the serrated portion 21 of the end of the conduit 7. As shown in FIG. 3, each collet piece has an internal serrated portion 32 which matches the serrated portion 21 and each collet piece has an outer surface 33 which is tapered to match the taper of wall of the wall portion 29.

A first spring means 35 extends between a collar 36 which bears on an end of the collet pieces and a shoulder 37 on the member 20. As shown, the first spring means 35 is operatively positioned between the end of the first cable conduit 7 and the locking means comprising the collets to force the collets into contact with the tapered wall 29 so they will move radially inwardly towards the serrated portion to lock therewith.

A locking release means 40 in the form of a tubular release member is positioned within housing 5 and surrounds control cable 3. The tubular member 40 has a shoulder 41 which prevents the member from being moved outwardly of the housing and at the same time provides a guide for the member when it moves within the housing. The member has a portion 43 which protrudes from the housing through the aperture 26 and is adapted to be engaged by the end of the second cable conduit 9.

A second spring means 44 is operatively positioned between the end of the conduit 7 within the housing 5 and the member 40 to urge the shoulder 41 into contact with the end of the housing.

The operation of the device is as follows. When, as shown in FIGS. 1 and 4, tension is exerted on the control cable 3 by depression of pedal 4, the control cable will be tensioned to pull the lever 12 against the force of the relatively heavy clutch spring 13. First spring means 35 will force the outer peripheral surface 33 of the collets into engagement with the tapered wall 29 of the housing with the result that the first cable conduit is then locked with respect to the housing. Compressive forces exerted on the cable conduit by the tensioned control cable resulting from the conduit guiding the control cable are absorbed by fire wall 6 and the cable anchorage point 8.

Upon release of the force depressing the pedal 4, the pedal will rotate in a counterclockwise direction under the force of the pedal return spring 10 to the pedal "up" position moving the second cable conduit to the left as shown in FIG. 5 where it will engage the end of the locking release means 40. Clutch release means 40 will move to the left to move the collet pieces against the force of the first spring means 35. This in turn allows the collet pieces to move radially outwardly of the serrated portion such that they unlock with the serrated portion. At this point the first cable conduit 7 is unlocked with respect to the housing and free to move therewith.

When the system is installed in a manual transmission system, wear of the clutch plates as discussed above results in effective lengthening of the control cable so that it will exert a compressive force in the direction of arrow 50 shown in FIG. 5 to move the first cable conduit to the right when no force is applied to the pedal 4. Movement of the conduit to the right effectively shortens its length to compensate for the increasing effect of the length of the cable. This movement of the conduit to the right continues until the compressive force exerted on the conduit by the clutch return spring through the cable 3 balances with the force of the second spring means 44 at which point the system will be in adjustment.

A self-adjusting cable conduit mechanism as described thus provides convenient adjustment to a control cable system and may be applied to existing control cable systems having a single control cable connecting a controlled member with an actuation member.

I claim:

1. A self-adjusting cable conduit mechanism for automatically compensating for wear in a control cable system where the system includes a movable control cable adapted to connect a controlled member with an actuation member; the improvement comprising in having a housing adapted to be anchored with respect to said control cable, a first cable conduit surrounding said control cable having an end terminating in said housing and adapted to extend from said housing towards said controlled member, a serrated portion on the end of said first cable conduit within said housing, a spring activated locking means within said housing adapted to engage and lock with said serrated portion to limit movement of said first cable conduit into said housing, a first spring means operatively positioned between said first cable conduit and said locking means to urge said locking means into locking engagement with said serrated portion, locking release means adapted to be operatively positioned between said actuation member and said locking means, second spring means operatively positioned between the end of said first cable conduit and said locking release means for urging said first cable conduit outwardly of said housing towards said controlled member whereby when said locking release means is moved by said actuation member against the force of said first and second springs, said locking means will unlock to allow the first cable conduit to move with respect to said housing under the influence of said second spring means to adjust its effective length with respect to said control cable.

2. A self-adjusting cable conduit mechanism according to claim 1 having in addition a second cable conduit surrounding said control cable having one end adapted to engage said locking release means and its other end engaged by said actuation member.

3. A self-adjusting cable conduit mechanism according to claim 2 wherein said locking means comprises a plurality of radially movable locking collets and wherein said housing includes a tapered wall portion adapted to engage said collets to force the collets radially inwardly towards said serrated portion to lock with the same under the force of said first spring means urging the collet portions into contact with said tapered wall portion.

4. A self-adjusting cable conduit mechanism according to claim 3 wherein said locking release means comprises a release tube within said housing adapted to surround said control cable and said second spring means where one end of said tube engages ends of said collet portions and the opposite end of said tube protrudes from said housing to engage an end of said second cable conduit when said second cable conduit is moved towards said housing by said actuation means.

* * * * *

UNITED STATES PATENT AND TRADEMARK OFFICE
CERTIFICATE OF CORRECTION

PATENT NO. : 4,344,518

DATED : August 17, 1982

INVENTOR(S) : William J. Gilmore

It is certified that error appears in the above—identified patent and that said Letters Patent is hereby corrected as shown below:

Col. 1, line 11, "clutch" should read --locking--;

Col. 3, line 67, "conduit 9" should read --conduit 7--;

Signed and Sealed this

Fourth Day of January 1983

[SEAL]

Attest:

GERALD J. MOSSINGHOFF

Attesting Officer

Commissioner of Patents and Trademarks